Sept. 27, 1966     M. ROSSNAN     3,274,640

METHOD OF REMOVING MEAT FROM CRABS

Original Filed Sept. 23, 1965     2 Sheets-Sheet 1

INVENTOR

Michael Rossnan

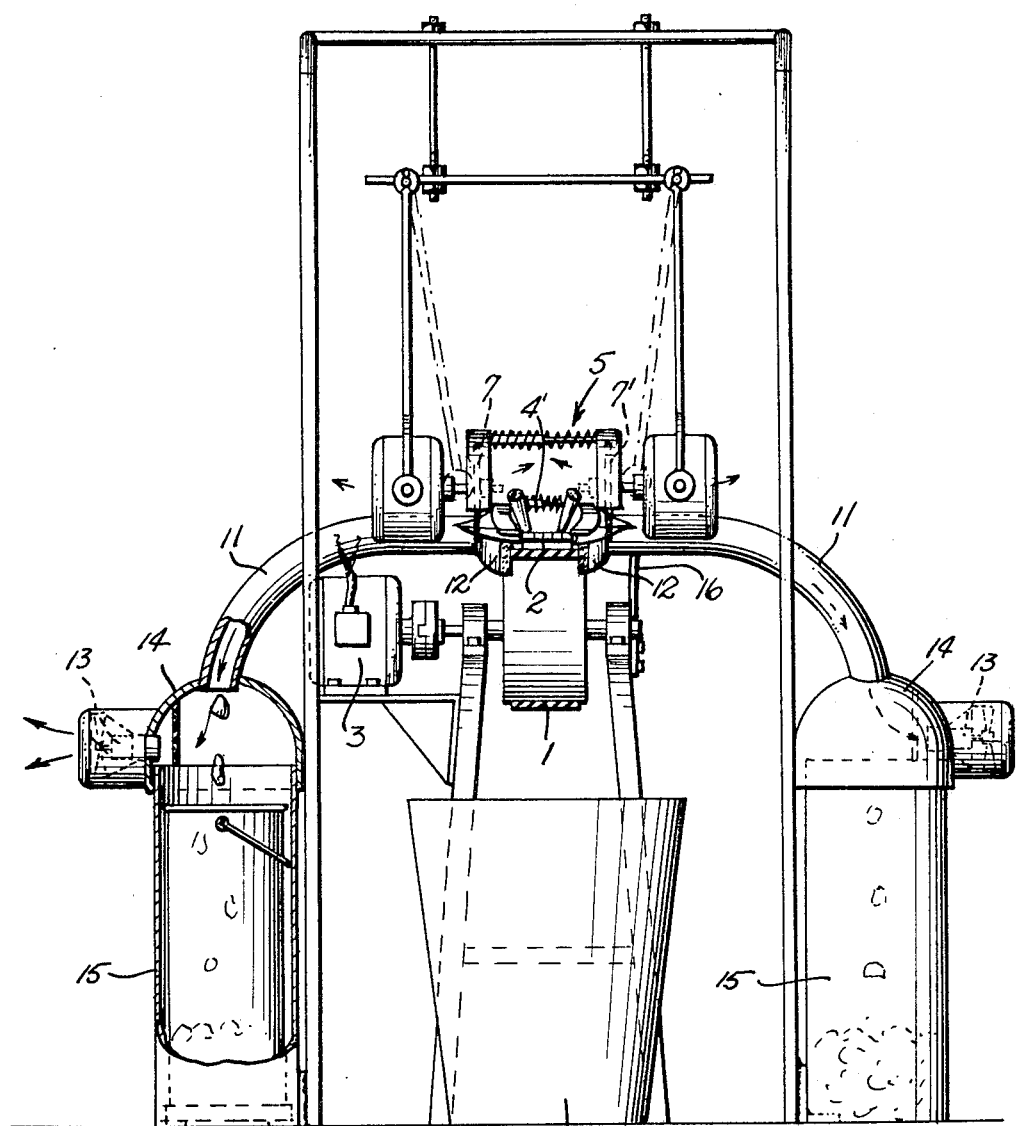

3,274,640
METHOD OF REMOVING MEAT FROM CRABS
Michael Rossnan, 11724 Lovejoy St., Silver Spring, Md.
Original application Sept. 23, 1965, Ser. No. 489,622, now Patent No. 3,249,962, dated May 10, 1966. Divided and this application Jan. 13, 1966, Ser. No. 520,419
4 Claims. (Cl. 17—45)

This is a division of my application No. 489,622, filed September 23, 1965, now Patent No. 3,249,962, issued May 10, 1966.

My present invention relates to improvements in method of removing meat from crabs, one object of the invention being an apparatus for removing the meat from the cells or chambers of a crab by suction action and thus obtain the meat without particles of the shell and whether the meat is raw or cooked.

Another object of the invention is the provision of a method for removing the meat from the chambers of the crab body which comprises placing the crab back shell down upon an intermittently moving belt, where the operator clamps the crab in a selected place on the belt, for its movement to the next stop, where two spaced rotary saws are brought into play to sever the claws, crawling fingers and the paddles from the body to leave open ended stubs, while also the ends of the main shell are cut off, the belt being narrow enough to permit the severed parts to drop away from the belt and be collected into a hopper, at the end of this action, the belt now moves the crab to the next stop where two suction heads that have movements imparted to them to clamp upon the crab body and over the stubs and at which time a heavy strong concentrated suction action takes places to suck all of the meat within the chambers of the crab body and into a collector member, and without being drawn into the motor driven high power suction unit, the carcass is now moved to the point where the clamp is released and the carcass falls free of the belt into a hopper.

That this invention may be fully understood and its many advantages appreciated, attention is invited to the accompanying drawings, in which:

FIGURE 3 is a vertical sectional view taken on line 3—3 of FIGURE 1.

FIGURE 4 is a horizontal sectional view on 4—4 of FIGURE 2. The crab shown in position to be worked upon.

Figure 1:
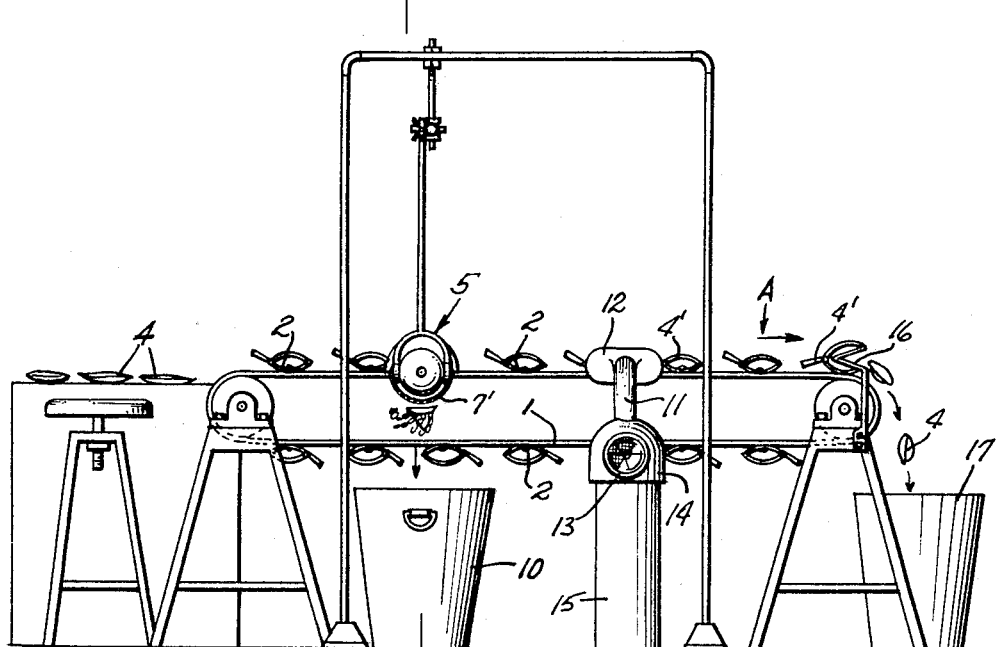
FIGURE 1 is a diagrammatical view of the complete apparatus in elevation.
Figure 2:
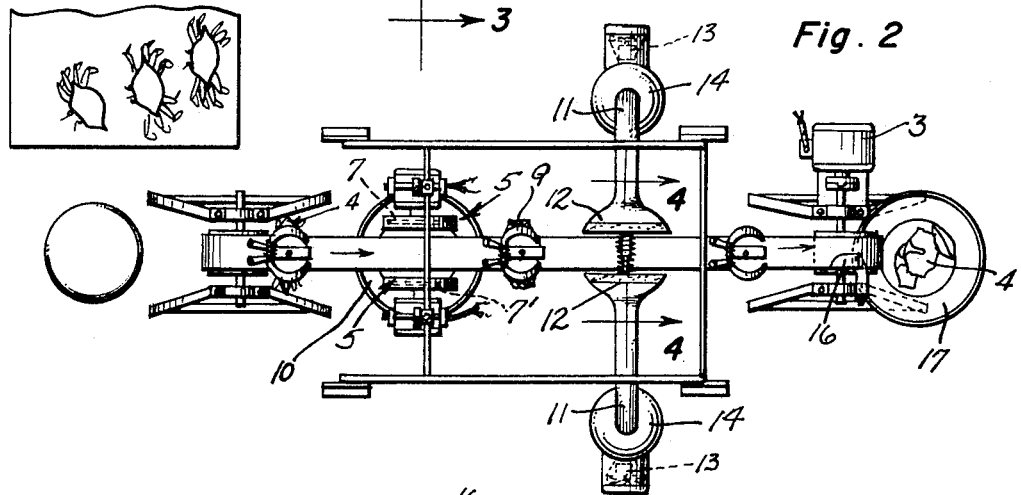
FIGURE 2 is a top plan view of the belt and crab holding device.
Figure 5:
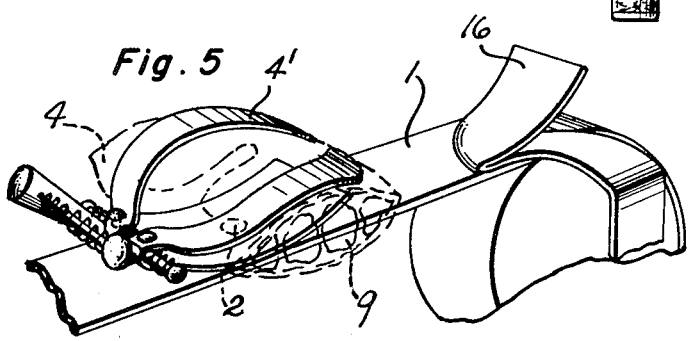
FIGURE 5 is a view of the crab body releasing mechanism.

Referring to the drawings, the numeral 1, designates an endless narrow belt provided with crab body receiving means 2, and the intermittent drive 3, or motor which moves the belt intermittently one step at a time, equal to the distance between the several means 2.

The motor 3, drives the belt, in the direction of the arrow, A, so that when the operator has placed the crab 4 into its receptacle 2, and fastened the clip 4', to hold the body in place, the belt now moves this crab body under the severing device 5, composed of two disc saws 7, 7', and the crab body, whose claws, crawling fingers, paddles and end portions of the main shell have been severed from the main crab body, leaving the open stubs 9, moves on to the next position.

The belt being made narrow permits the severed parts to drop into the hopper 10, while the belt now moves the thus held crab body to the suction position, where the mounted flexible, tube arms 11, carrying the suction heads 12, are cammed apart by the crab body and are moved inwardly by the spring action of spring 8, and into suction tight engagement with the opposite sides of the body of the crab and covering the open stubs, while simultaneously with this gripping, heavy suction from the motor driven suction device 13, acts to draw the meat from the cavities or chambers of the crab body, into the removal top 14 of the hopper 15, where the thus sucked meat is deposited.

At the end of this suction action, the belts move again and the suction heads are cammed away from the crab body against the tension of spring 8, and the belt continues to move, this time to the clamp-releasing device 16, which is composed of a fixed metal wedge bracket to engage the gripping device to open the same and release the crab shell and as the belt is at its end of horizontal movement, the free crab shell is now dropped into its hopper 17. This cycle is repeated each time a crab is placed and clamped in its holder at the entrance or in this instance the left end of the endless belt.

From the foregoing description, taken with the drawings, it will be evident that here is provided an apparatus and also through it, a method of sucking the meat from the crab body so that only the body shell is left, and that the machine provides an intermittent action that provides means for the clamping of the crab, so that the belt by its intermittently operated action, deliver the then thus held crab to have its claws, crawlers, paddles, and end of the main shell removed and freed from the belt, then to the suction position, whereby a blast suction the meat is removed through the hollow stubs from the body cavities and collected in the removable hopper, and the thus cleared crab shell body is then released at the end where the endless belt passes over the end pulley, thus dropping the shell into a hopper.

What I claim as new is:

1. The method of removing meat from a crab body, comprising removing the claws, crawling fingers, paddles and ends of the main shell to leave open ended stubs leading to the cavities of the crab body, and sucking the meat from all the cavities simultaneously.

2. The method of claim 1 wherein the crab body is conveyed by endless conveying means in a substantially linear path to said removing and sucking regions.

3. The method of claim 2 wherein the crab body is clamped to said conveying means while being worked upon.

4. The method of claim 2 wherein the crab body is released from said conveying means following the sucking step.

References Cited by the Examiner
UNITED STATES PATENTS

| | | | |
|---|---|---|---|
| 965,706 | 7/1910 | Greiner | 17—2 |
| 2,277,686 | 3/1942 | Blount | 131—254 |
| 2,903,737 | 9/1959 | Ward | 17—45 |

FOREIGN PATENTS

| | | |
|---|---|---|
| 145,140 | 2/1952 | Australia. |
| 150,306 | 2/1953 | Australia. |

SAMUEL KOREN, *Primary Examiner.*

LUCIE H. LAUDENSLAGER, *Examiner.*